United States Patent
Hosokawa et al.

(10) Patent No.: US 9,074,645 B2
(45) Date of Patent: Jul. 7, 2015

(54) DRIVING FORCE TRANSMISSION CONTROL SYSTEM

(71) Applicant: JTEKT CORPORATION, Osaka-shi (JP)

(72) Inventors: Takashi Hosokawa, Takahama (JP); Kunihiko Suzuki, Gamagori (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/332,694

(22) Filed: Jul. 16, 2014

(65) Prior Publication Data
US 2015/0025763 A1    Jan. 22, 2015

(30) Foreign Application Priority Data
Jul. 18, 2013    (JP) .................................. 2013-149595

(51) Int. Cl.
*F16D 48/06* (2006.01)
*F16D 13/38* (2006.01)
*B60W 10/02* (2006.01)

(52) U.S. Cl.
CPC ...... *F16D 48/06* (2013.01); *F16D 2500/70217* (2013.01); *B60W 10/02* (2013.01); *F16D 2500/70406* (2013.01); *F16D 13/38* (2013.01)

(58) Field of Classification Search
None
See application file for complete search history.

(56) References Cited

U.S. PATENT DOCUMENTS

| 6,358,179 | B1* | 3/2002 | Sakai et al. ................... 475/216 |
| 2004/0238311 | A1 | 12/2004 | Parigger |
| 2008/0234101 | A1* | 9/2008 | Suzuki ........................... 477/97 |
| 2010/0100294 | A1* | 4/2010 | Hirao et al. .................... 701/68 |
| 2012/0202648 | A1* | 8/2012 | Kikura et al. .................. 477/87 |
| 2013/0056321 | A1* | 3/2013 | Fujii et al. ................... 192/48.1 |
| 2014/0172258 | A1* | 6/2014 | Mita et al. ...................... 701/69 |

FOREIGN PATENT DOCUMENTS

JP    2005-527741    9/2005

* cited by examiner

*Primary Examiner* — Justin Holmes
(74) *Attorney, Agent, or Firm* — Oblon, McClelland, Maier & Neustadt, L.L.P.

(57) ABSTRACT

A driving force transmission control system includes: an electric motor; a multi-disc clutch; a cam mechanism that converts rotation output from the electric motor into cam thrust force that is axial force in the axial direction of the multi-disc clutch; a pressure-conversion mechanism that converts reaction force against the cam thrust force into pressure of a fluid; a pressure sensor that detects the pressure; and a control unit that computes a command value of a current supplied to the electric motor. The control unit stores the pressure of the fluid during disengagement of the multi-disc clutch, and computes the current command value based on the pressure of the fluid to which the reaction force against the cam thrust force has been applied, and the stored pressure of the fluid.

9 Claims, 13 Drawing Sheets

F I G . 7
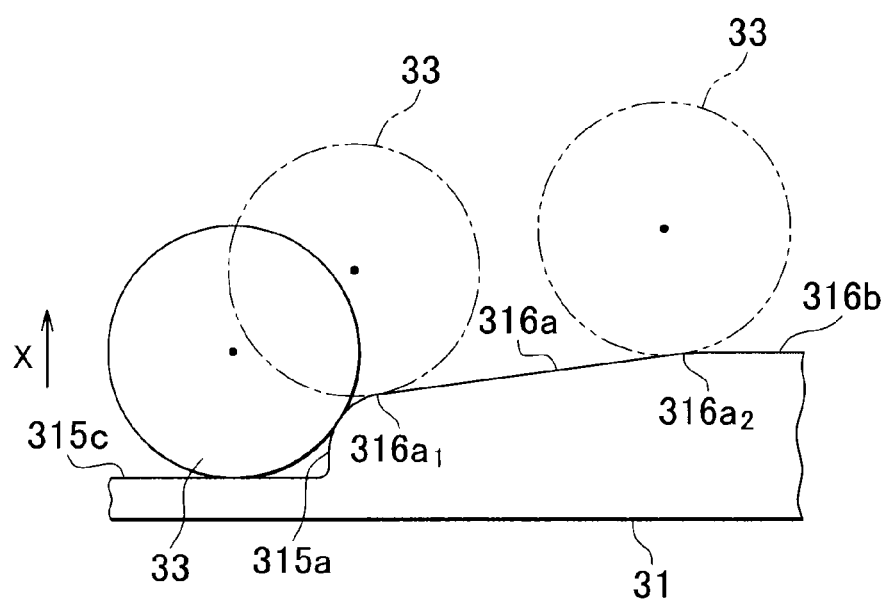

DRIVING FORCE TRANSMISSION CONTROL SYSTEM

INCORPORATION BY REFERENCE

The disclosure of Japanese Patent Application No. 2013-149595 filed on Jul. 18, 2013 including the specification, drawings and abstract, is incorporated herein by reference in its entirety.

BACKGROUND OF THE INVENTION

1. Field of the Invention

The invention relates to a driving force transmission control system that controls and transmits driving force that is input into an input shaft and transmitted to an output shaft such that the amount of driving force to be transmitted is variable.

2. Description of the Related Art

There is a conventional driving force transmission control system that includes a conversion mechanism which converts rotative force generated by an electric motor into axial thrust force, and that transmits driving force generated by an engine from an input shaft to an output shaft such that the amount of driving force to be transmitted is variable, by pressing a friction clutch with the thrust force. A driving force transmission control system of this type is mounted in, for example, a four-wheel-drive vehicle provided with main drive wheels to which the driving force generated by the engine is constantly transmitted and auxiliary drive wheels to which the driving force generated by the engine is transmitted depending on a vehicle travelling state, and is used to adjust the driving force that is transmitted to the auxiliary drive wheels. A driving force transmission control system of this type is described in, for example, Published Japanese Translation of PCT application No. 2005-527741.

In the driving force transmission control system described in Published Japanese Translation of PCT application No. 2005-527741, the rotational position of an electric motor is computed from the torque that should be transmitted by a friction clutch on the basis of a characteristic curve indicating a prescribed relationship between transmission torque transmitted by the friction clutch in which clutch plates are lubricated with a lubricant, and the rotational position of the electric motor. Then, the torque to be transmitted by the friction clutch is accurately and promptly adjusted by outputting a current value corresponding to the rotational position to the electric motor to control driving of the electric motor.

However, it was found by the inventors of the invention that, in the driving force transmission control system having the above-described configuration, even when the current supplied to the electric motor is constant, the torque to be transmitted by the friction clutch varies depending on the temperature. One of the factors of the variations is the influence of the variations in the viscosity of a lubricant present between the clutch plates due to the temperature variations.

Generally, the viscosity of the lubricant used to lubricate the clutch plates varies depending on the temperature. The viscosity of the lubricant is low when the temperature is high, whereas the viscosity of the lubricant is high when the temperature is low. Thus, the torque that is transmitted by the friction clutch is influenced by the variations in the viscosity of the lubricant due to the temperature variations. A relatively high torque is transmitted to the output shaft when the temperature of the lubricant is low, for example, when the engine is started in a cold region. This causes a possibility that the driving force will not be appropriately distributed to front wheels and rear wheels and fuel efficiency will be lowered with an increase in rotational resistance in a differential mechanism located on the auxiliary drive wheel side.

SUMMARY OF THE INVENTION

One object of the invention is to provide a driving force transmission control system that is able to suppress variations in transmission torque due to temperature variations.

A driving force transmission control system according to an aspect of the invention includes: an electric motor; a clutch including an outer friction member and an inner friction member that are disposed on the same axis so as to be rotatable relative to each other and that are frictionally engaged with each other by being pressed in an axial direction of the clutch; an outer rotary member that rotates together with the outer friction member; an inner rotary member that rotates together with the inner friction member; a cam mechanism that receives rotative force from the electric motor to generate cam thrust force for pressing the clutch in the axial direction; a pressure-conversion mechanism that includes a piston that receives reaction force against the cam thrust force from the cam mechanism, and that converts the reaction force into pressure of a fluid in a pressure chamber using the piston; a pressure sensor that detects the pressure of the fluid; and a control unit that computes a command value of a current to be supplied to the electric motor. The control unit stores the pressure of the fluid during disengagement of the clutch or a correlated value correlated with the pressure of the fluid during disengagement of the clutch, and computes the command value based on the pressure of the fluid to which the reaction force against the cam thrust force has been applied, and the stored pressure of the fluid or the stored correlated value.

With the driving force transmission control system according to the above aspect, it is possible to suppress variations in the transmission torque due to temperature variations.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7 is an explanatory diagram illustrating an operation of the cam mechanism;

DETAILED DESCRIPTION OF EMBODIMENTS

Figure 1:
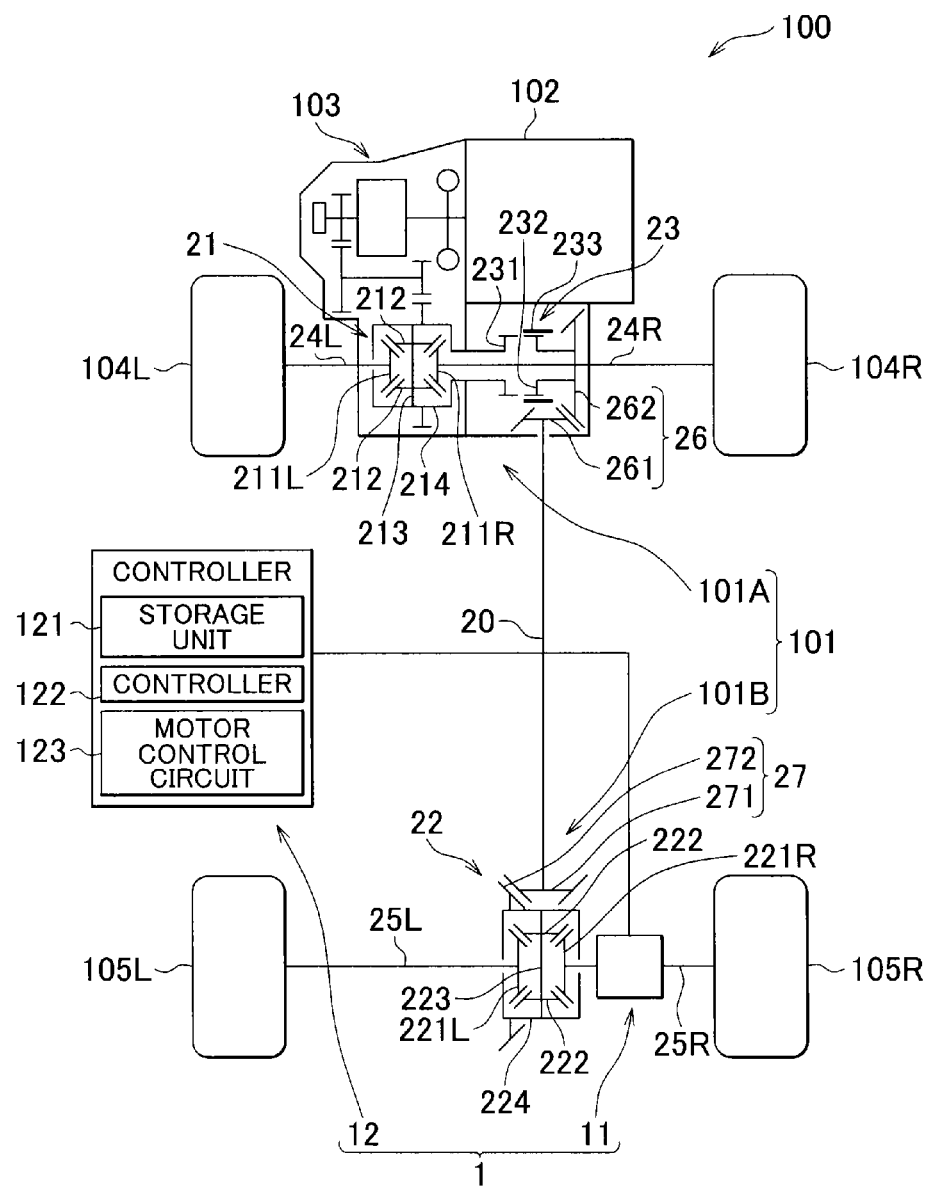
FIG. 1 is a configuration diagram schematically illustrating a four-wheel-drive vehicle in which a controller of a driving force transmission control system according to a first embodiment of the invention is mounted.

Hereinafter, embodiments of the invention will be described with reference to the accompanying drawings. FIG. 1 is a diagram schematically illustrating the configuration of a four-wheel-drive vehicle 100 in which a driving force transmission control system 1 according to a first embodiment of the invention is mounted.

The four-wheel-drive vehicle 100 includes a driving force transmission system 101, a driving force transmission apparatus 11, a controller 12, an engine 102 that serves as a main drive source, a transmission 103, front wheels 104R, 104L that serve as main drive wheels, and rear wheels 105R, 105L that serve as auxiliary drive wheels. In FIG. 1, a reference symbol R denotes the right side with respect to the direction of forward travelling of the four-wheel-drive vehicle 100a, and a reference symbol L denotes the left side with respect to the direction of forward travelling of the four-wheel-drive vehicle 100.

The driving force transmission system 101 includes a front-wheel-side driving force transmission system 101A, a rear-wheel-side driving force transmission system 101B, and a propeller shaft 20 that connects the front-wheel-side driving force transmission system 101A and the rear-wheel-side driving force transmission system 101B to each other. The driving force transmission system 101 is configured to switch the four-wheel-drive vehicle 100 from a four-wheel-drive mode into a two-wheel-drive mode or from the two-wheel-drive mode into the four-wheel-drive mode. The driving force transmission system 101 is disposed, along with a front differential 21 and a rear differential 22, on a driving force transmission path extending from the transmission 103 side of the four-wheel-drive vehicle 100 to the rear wheels 105R, 105L, and is mounted in a vehicle body (not illustrated) of the four-wheel-drive vehicle 100.

The front-wheel-side driving force transmission system 101A includes the front differential 21 and a driving force interrupter 23, and is disposed on the front wheels 104R, 104L side of the propeller shaft 20.

The front differential 21 includes side gears 211R, 211L, a pair of pinion gears 212, a gear support member 213 by which the pinion gears 212 are rotatably supported, and a front differential case 214 that accommodates the side gears 211R, 211L and the pinion gears 212. The front differential 21 is connected to the transmission 103. The side gear 211L is connected to an axle shaft 24L located on the front wheel 104L side, and the side gear 211R is connected to an axle shaft 24R located on the front wheel 104R side. The pinion gears 212 mesh with the side gears 211R, 211L with their gear axes extending perpendicularly to the gear axes of the side gears 211R, 211L.

The driving force interrupter 23 is a dog clutch having a first spline tooth portion 231, a second spline tooth portion 232, and a sleeve 233. The driving force interrupter 23 is disposed on the front wheels 104R, 104L side in the four-wheel-drive vehicle 100. The sleeve 233 is advanced or retracted by an actuator (not illustrated). The first spline tooth portion 231 is connected to the front differential case 214 so as to be non-rotatable relative to the front differential case 214. The second spline tooth portion 232 is connected to a ring gear 262 so as to be non-rotatable relative to the ring gear 262. The sleeve 233 is connected to the first spline tooth portion 231 and the second spline tooth portion 232 so as to be spline-fittable to the first spline tooth portion 231 and the second spline tooth portion 232. With this configuration, the driving force interrupter 23 connects the propeller shaft 20 to the front differential case 214 such that the propeller shaft 20 is disengageable from the front differential case 214.

The rear-wheel-side driving force transmission system 101B includes the rear differential 22 and the driving force transmission apparatus 11. The rear-wheel-side driving force transmission system 101B is disposed on the rear wheels 105R, 105L side of the propeller shaft 20

The rear differential 22 includes side gears 221R, 221L, a pair of pinion gears 222, a gear support member 223 by which the pinion gears 222 are rotatably supported, and a rear differential case 224 that accommodates the side gears 221R, 221L and the pinion gears 222. The rear differential 22 is connected to the propeller shaft 20. The pinion gears 222 mesh with the side gears 221R, 221L with their gear axes extending perpendicularly to the gear axes of the side gears 221R, 221L. The side gear 221L is connected to an axle shaft 25L located on the rear wheel 105L side. The side gear 221R is connected to an axle shaft 25R located on the rear wheel 105R via the driving force transmission apparatus 11.

The driving force transmission apparatus 11 is able to establish or interrupt connection between the side gear 221R of the rear differential 22 and the axle shaft 25R. If the side gear 221R of the rear differential 22 and the axle shaft 25R are disconnected from each other, the driving force generated by the engine 102 is no longer transmitted to the rear wheel 105R. At the same time, transmission of the driving force to the rear wheel 105L is interrupted due to idle rotation of the side gears 221R, 221L and the pinion gears 222 of the rear differential 22.

On the other hand, when the side gear 221R of the rear differential 22 and the axle shaft 25R are connected to each other, the driving force generated by the engine 102 is transmitted to the rear wheel 105R. At the same time, the driving force is also transmitted to the rear wheel 105L via the side gear 221L of the rear differential 22. As a result, the four-wheel-drive vehicle 100 is placed in the four-wheel-drive mode.

The front wheels 104R, 104L are driven by the driving force generated by the engine 102 and transmitted to the axle shafts 24R, 24L via the transmission 103 and the front differential 21. The rear wheel 105L is driven by the driving force generated by the engine 102 and transmitted to the axle shaft 25L via the transmission 103, the driving force interrupter 23, the propeller shaft 20 and the rear differential 22. The rear wheel 105R is driven by the driving force generated by the engine 102 and transmitted to the axle shaft 25R via the transmission 103, the driving force interrupter 23, the propeller shaft 20, the rear differential 22 and the driving force transmission apparatus 11.

A front-wheel-side gear mechanism 26 including a drive pinion 261 and the ring gear 262 that mesh with each other is disposed at the front wheel 104R, 104L-side end portion of the propeller shaft 20. A rear-wheel-side gear mechanism 27 including a drive pinion 271 and a ring gear 272 that mesh with each other is disposed at the rear wheel 105R, 105L-side end portion of the propeller shaft 20.

The controller 12 includes a storage unit 121, a control unit 122 and a motor control circuit 123. The storage unit 121 is formed of storage elements such as a read only memory (ROM) and a random access memory (RAM). The control unit 122 includes a central processing unit (CPU) that operates according to a program stored in the storage unit 121. The motor control circuit 123 controls an electric motor 5 (described later) of the driving force transmission apparatus 11 based on a current command value computed by the control unit 122. When a current is supplied to the electric motor 5 by the motor control circuit 123, the driving force generated by the engine 102 is transmitted from the side gear 221R of the rear differential 22 to the axle shaft 25R by the driving force transmission apparatus 11. On the other hand, if the supply of current to the electric motor 5 is stopped, the side gear 221R of the rear differential 22 and the axle shaft 25R are disconnected from each other.

Figure 2:
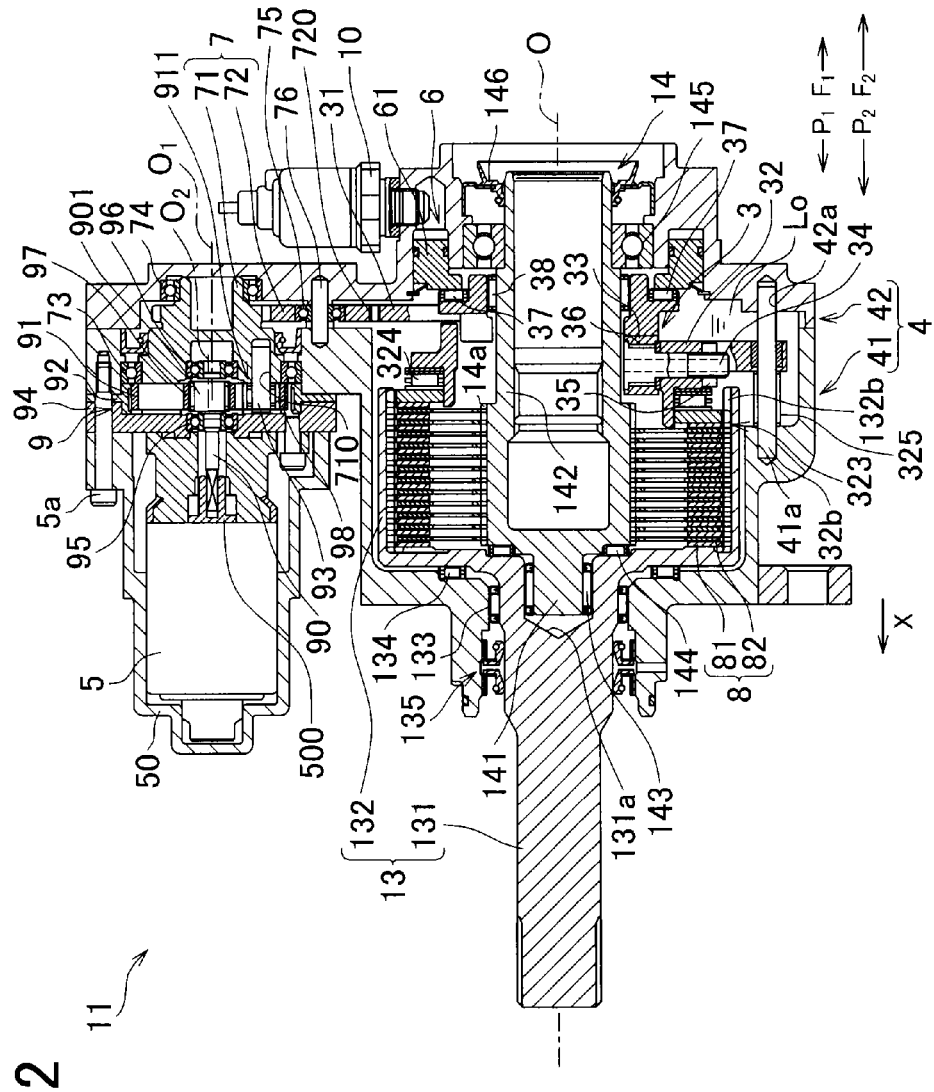
FIG. 2 is a sectional view illustrating an example of the configuration of the driving force transmission apparatus.

FIG. 2 is a sectional view illustrating an example of the configuration of the driving force transmission apparatus 11. In FIG. 2, the upper side with respect to a rotation axis O indicates the non-operating state and the lower side with respect to the rotation axis O indicates the operating state.

The driving force transmission apparatus 11 includes the electric motor 5, a speed reduction mechanism 9, a multi-disc clutch 8, an outer rotary member 13, an inner rotary member 14, a cam mechanism 3, a pressure-conversion mechanism 6, a pressure sensor 10, and a housing 4. The speed reduction mechanism 9 reduces the speed of rotation transmitted from an output shaft 500 of the electric motor 5. The multi-disc clutch 8 includes a plurality of outer clutch plates 81, which may function as a first friction member, and a plurality of inner clutch plates 82, which may function as a second friction member. The outer rotary member 13 rotates together with the outer clutch plates 81. The inner rotary member 14 rotates together with the inner clutch plates 82. The cam mechanism 3 generates cam thrust force for pressing the multi-disc clutch 8 in the axial direction, from the torque generated by the electric motor 5. The pressure-conversion mechanism converts reaction force against the thrust force generated by the cam mechanism 3 into a pressure of a fluid L. The pressure sensor 10 detects a pressure of the fluid L. The housing 4 includes a main body 41 and a lid 42.

Multiple (three in the present embodiment) guide members 32b are disposed parallel to the rotation axis O, between the main body 41 and the lid 42 of the housing 4. Each guide member 32b has a columnar shape. One axial end portion of each guide member 32b is fixedly fitted in a corresponding one of holding holes 41a formed in the main body 41 and the other end portion thereof is fixedly fitted in a corresponding one of holding holes 42a formed in the lid 42. A return spring 325, which serves as an urging member that axially urges a retainer 32 of the cam mechanism 3, is fitted onto the guide member 32b. The return spring 325 is disposed between the main body 41 and the retainer 32 in an axially compressed state. The retainer 32 is elastically pressed toward the lid 42 by the restoring force of the return spring 325, and thus movement of the retainer 32 toward the multi-disc clutch 8 is suppressed when the multi-disc clutch 8 is disengaged.

The electric motor 5 is controlled by the controller 12. The controller 12 computes a command value of a current that is supplied to the electric motor 5 on the basis of the pressure of the fluid L such that a cam thrust force based on the torque to be transmitted by the multi-disc clutch 8 is generated. In the present embodiment, the electric motor 5 has a configuration in which currents are supplied to coils disposed on a stator to generate a magnetic field and the magnetic field acts on permanent magnets provided in a rotor to rotate the rotor. However, the kind of the electric motor is not particularly limited as long as the electric motor is able to convert electric energy into mechanical energy. For example, a linear motor may be employed. That is, an electric motor is a collective term of instruments that convert electric energy into mechanical energy, and electric motors include an actuator that turns within a limited angle range.

The multi-disc clutch 8 is a wet clutch in which the outer clutch plates 81 and the inner clutch plates 82 are lubricated with a lubricant Lo sealed in the housing 4. Abrasion due to frictional sliding between the outer clutch plates 81 and the inner clutch plates 82 is suppressed by this lubricant Lo. The lubricant Lo is formed of, for example, mineral oil and is sealed in the housing 4 at a filling rate of 20% to 80%.

The outer rotary member 13 is a single-piece member having a shaft portion 131 and a cylindrical portion 132 having a bottomed cylinder shape. The axis of the shaft portion 131 coincides with the rotation axis O. The cylindrical portion 132 opens toward the side (cam mechanism 3 side) opposite to the shaft portion 131. The outer rotary member 13 is rotatably supported by the inner face of the main body 41 of the housing 4 via needle roller bearings 133, 134. The shaft portion 131 is connected to the side gear 221R (refer to FIG. 1) of the rear differential 22 by spline-fitting. The gap between the outer peripheral face of the shaft portion 131 and the inner face of the main body 41 of the housing 4 is sealed with a pair of sealing mechanisms 135 arranged next to each other along the direction of the rotation axis O.

The inner rotary member 14 is a single-piece member having a shaft-shaped boss portion 141 and a cylindrical portion 142 having a bottomed cylinder shape. The axis of the boss portion 141 coincides with the rotation axis O. The cylindrical portion 142 opens toward the side (the rear wheel 105R side illustrated in FIG. 1) opposite to the boss portion 141. The inner rotary member 14 is rotatably supported by the inner face of the cylindrical portion 132 of the outer rotary member 13 via needle roller bearings 143, 144. The inner rotary member 14 is rotatably supported by the lid 42 of the housing 4 via a ball bearing 145. A distal end portion of the axle shaft 25R (refer to FIG. 1) is inserted into the cylindrical portion 142 of the inner rotary member 14 through an opening thereof. The axle shaft 25R is connected to the inner rotary member 14 by spline-fitting so as to be non-rotatable relative to the inner rotary member 14 and so as to be movable relative to the inner rotary member 14 in the direction of the rotation axis O.

The boss portion 141 is accommodated in a recessed portion 131a formed in the cylindrical portion 132-side end portion of the shaft portion 131 of the outer rotary member 13. The outer diameter of the boss portion 141 is set smaller than the outer diameter of the cylindrical portion 142. The gap between the outer peripheral face of an opening-side portion of the cylindrical portion 142 and the inner face of the lid 42 of the housing 4 is sealed with a seal member 146.

The multi-disc clutch 8 is disposed between the outer rotary member 13 and the inner rotary member 14. The outer clutch plates 81 and the inner clutch plates 82 of the multi-disc clutch 8 are alternately disposed on the same axis (on the rotation axis O) so as to be rotatable relative to each other, and are frictionally engaged with each other by being pressed in the direction of the rotation axis O.

The outer clutch plates 81 are spline-fitted to a straight spline fitting portion 132b formed on the inner peripheral face of the cylindrical portion 132 of the outer rotary member 13. The outer clutch plates 81 are connected to the outer rotary member 13 so as to be non-rotatable relative to the outer rotary member 13 and so as to be movable relative to the outer rotary member 13 in the direction of the rotation axis O.

The inner clutch plates 82 are spline-fitted to a straight spline fitting portion 14a formed on the outer peripheral face of the cylindrical portion 142 of the inner rotary member 14. The inner clutch plates 82 are connected to the inner rotary member 14 so as to be non-rotatable relative to the inner rotary member 14 and so as to be movable relative to the inner rotary member 14 in the direction of the rotation axis O.

The electric motor 5 is accommodated in an electric motor housing 50. The electric motor housing 50 is attached via an adapter 94 to the main body 41 of the housing 4 with a bolt 5a. The output shaft 500 of the electric motor 5 is connected to the cam mechanism 3 via the speed reduction mechanism 9 and a gear transmission mechanism 7.

The gear transmission mechanism 7 includes a first gear 71 and a second gear 72. The first gear 71 is disposed on a rotation axis $O_1$ of the speed reduction mechanism 9, and is rotatably supported by the inner face of the main body 41 of the housing 4 via ball bearings 73, 74. The second gear 72 is disposed such that a gear portion 720 meshes with the first gear 71, and is rotatably supported by a support shaft 76 via a ball bearing 75. The gear transmission mechanism 7 receives the rotation, which is output from the electric motor 5 and of which the speed is reduced by the speed reduction mechanism 9, and transmits the rotation with a reduced speed to the cam mechanism 3. The rotation axis of the output shaft 500 coincides with the rotation axis $O_1$ of the speed reduction mechanism 9.

The speed reduction mechanism 9 is an eccentric oscillating speed reduction mechanism. More specifically, the speed reduction mechanism 9 is an involute speed reduction mechanism with a small difference in the number of teeth. The speed reduction mechanism 9 includes a rotary shaft 90, an input member 91, a rotation force applying member 92 and a plurality of (FIG. 2 illustrates only one of the output members 93) output members 93. The rotary shaft 90 is connected to the output shaft 500 of the electric motor 5 so as to be non-rotatable relative to the output shaft 500. The input member 91 includes an eccentric portion 901 having a central axis that is an axis $O_2$, which is offset by a prescribed eccentric amount from the axis $O_1$ of the speed reduction mechanism 9, and an external gear having a center hole that accommodates the eccentric portion 901. The output members 93 receive, from the input member 91, the rotation force applied by the rotation force applying member 92, and output the rotation force to the first gear 71 of the gear transmission mechanism 7.

The rotary shaft 90 is rotatably supported by ball bearings 95, 96 and is passed through the eccentric portion 901. The eccentric portion 901 rotates together with the rotary shaft 90, and makes an eccentric rotation motion about the rotation axis $O_1$. A needle roller bearing 97 is interposed between the outer peripheral face of the eccentric portion 901 and the inner peripheral face of the input member 91, which defines the center hole. In the input member 91, multiple insertion holes 911 (FIG. 2 illustrates only one of the insertion holes 911) through which the output members 93 are passed are formed at equal intervals along the circumferential direction. A needle roller bearing 98 is interposed between the outer peripheral face of each output member 93 and the inner peripheral face of the input member 91, which defines a corresponding one of the insertion holes 911.

The pitch circle diameter of internal teeth of the rotation force applying member 92 is larger than the pitch circle diameter of external teeth of the input member 91. The rotation force applying member 92 is meshed with a part of the input member 91 that makes an eccentric rotation motion to apply rotation force to the input member 91. The output members 93 are passed through the insertion holes 911 of the input member 91 and are fitted in pin-fitting holes 710 of the first gear 71 of the gear transmission mechanism 7. The output members 93 receive, from the input member 91, the rotation force applied by the rotation force applying member 92 and output the received rotation force to the first gear 71 of the gear transmission mechanism 7.

The configuration of the cam mechanism 3 will be described below in detail with reference to FIG. 3 to FIG. 7.

Figure 3:
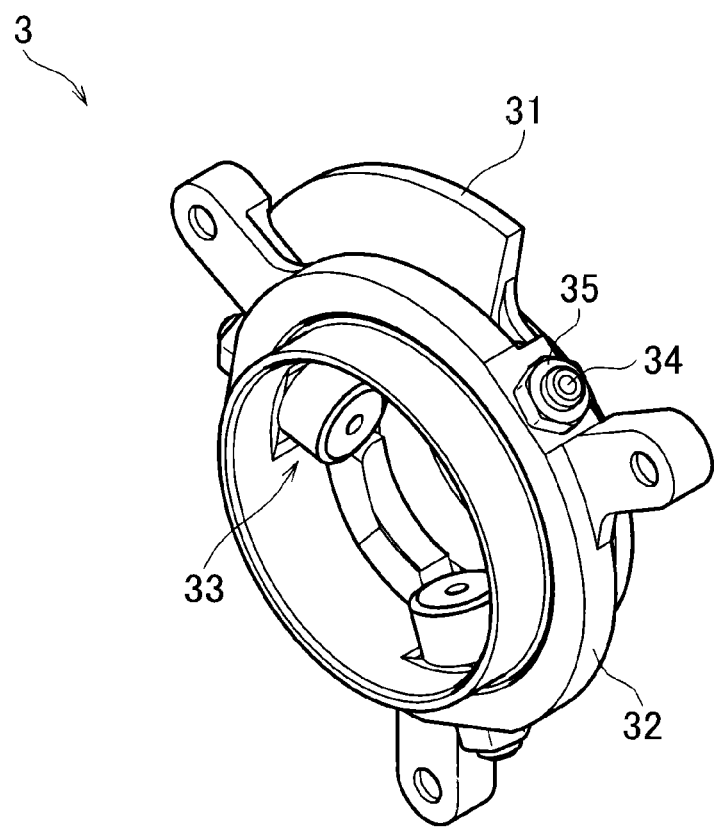
FIG. 3 is a perspective view illustrating an example of the configuration of a cam mechanism.
Figure 4:
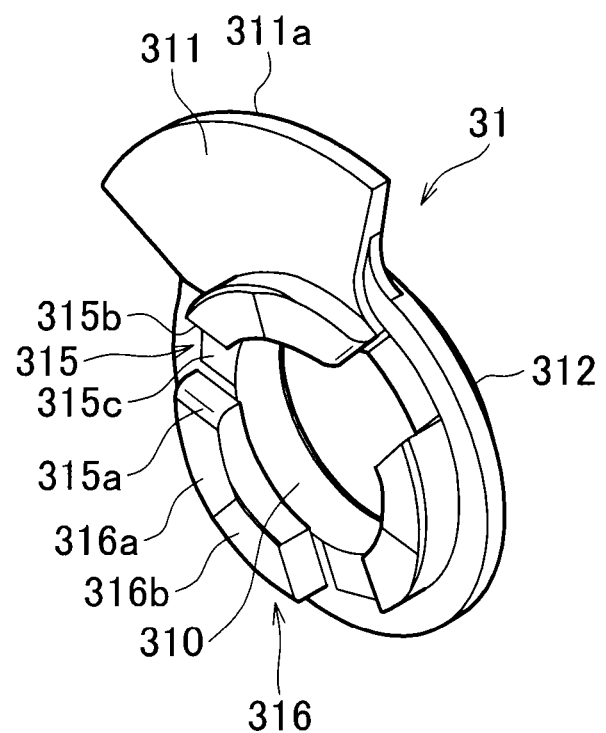
FIG. 4 is a perspective view illustrating a cam member of the cam mechanism.
Figure 5:
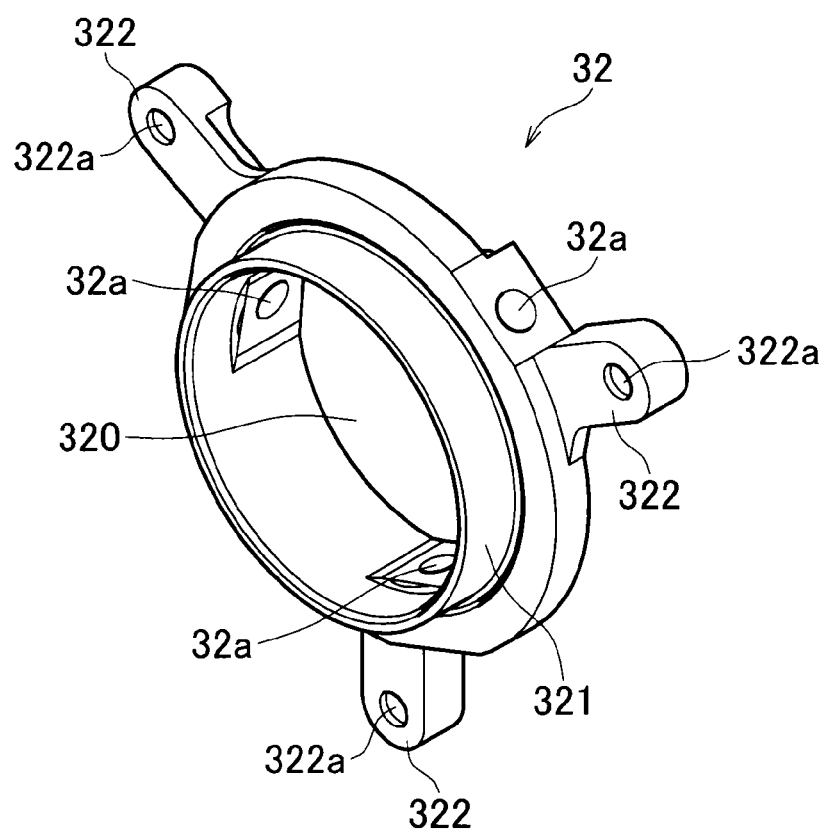
FIG. 5 is a perspective view illustrating a retainer of the cam mechanism.
Figure 6:
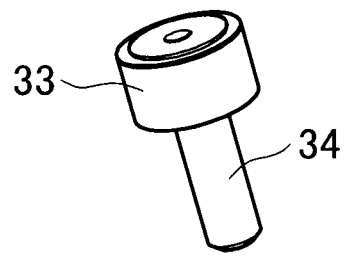
FIG. 6 is a perspective view illustrating a rolling member and a support pin of the cam mechanism.

FIG. 3 is a perspective view illustrating an example of the configuration of the cam mechanism 3. FIG. 4 is a perspective view illustrating a cam member 31 of the cam mechanism 3. FIG. 5 is a perspective view illustrating the retainer 32 of the cam mechanism 3. FIG. 6 is a perspective view illustrating a rolling member 33 and a support pin 34 of the cam mechanism 3. FIG. 7 is an explanatory diagram illustrating an operation of the cam mechanism 3.

The cam mechanism 3 receives the rotation, which is output from the electric motor 5 and of which the speed is reduced by the speed reduction mechanism 9, and generates thrust force with which the multi-disc clutch 8 is pressed in the direction of the rotation axis O. The cam mechanism 3 converts the rotative force generated by the electric motor 5 into thrust force that presses the multi-disc clutch 8.

The cam mechanism 3 includes the annular cam member 31, the rolling members 33 and the retainer 32. The cam member 31 rotates upon reception of the rotative force generated by the electric motor 5. Each rolling member 33 rolls on a cam face formed in the cam member 31. The retainer 32 is an output member that outputs the thrust force generated by the rolling of the rolling member 33 toward the multi-disc clutch 8. The cam mechanism 3 is disposed radially outward of the cylindrical portion 142 of the inner rotary member 14. A needle roller bearing 38 (refer to FIG. 2) is disposed between the cam member 31 and the cylindrical portion 142.

As illustrated in FIG. 4 the cam member 31 has an insertion hole 310 through which the inner rotary member 14 is passed. A generally sector-shaped protruding piece 311 that protrudes radially outward is formed on a portion of the outer periphery of the cam member 31. The protruding piece 311 has, on its outer peripheral face, a gear portion 311a that meshes with the second gear 72 (gear portion 720) of the gear transmission mechanism 7. The gear portion 720 of the second gear 72 and the gear portion 311a of the cam member 31 are each formed of a spur gear, and the cam member 31 is movable relative to the second gear 72 along the direction of rotation axis O.

A cylindrical portion 312 is formed on the axial one-side end face of the cam member 31. The cylindrical portion 312 protrudes from the opening edge of the insertion hole 310 toward the rear wheel 105R (refer to FIG. 1). Protrusions 316 and recesses 315 that form the cam face opposed to the multi-disc clutch 8 are formed on the axial other-side end face of the cam member 31.

The recesses 315 and the protrusions 316 are arranged alternately in the circumferential direction of the cam member 31. In the present embodiment, three recesses 315 and three protrusions 316 are arranged adjacent to one another. Each of the recesses 315 is formed of a cutout having a substantially rectangular cross section. The cutout is defined by a pair of cutout side faces 315a, 315b and a cutout bottom face 315c. The cutout side faces 315a, 315b have a substantially uniform cutout width. The cutout bottom face 315c is located between the cutout side faces 315a, 315b.

Each of the protrusions 316 has a tilted face 316a and a flat face 316b. The tilted face 316a is tilted along the circumferential direction of the cam member 31. The tilted face 316a is tilted so that the axial thickness of the cam member 31 is gradually increased from the recess 315 side toward the flat face 316b. The flat face 316b is formed as a flat face at which the axial thickness of the cam member 31 is substantially uniform.

As illustrated in FIG. 5, the retainer 32 has an annular shape and has an insertion hole 320 through which the inner rotary member 14 is passed. The rotation of the retainer 32 relative to the housing 4 is restricted by a plurality of (three in the present embodiment) the guide members 32b (refer to FIG. 2).

A cylindrical portion 321 is formed on the multi-disc clutch 8-side end face of the retainer 32. The cylindrical portion 31 protrudes from the opening edge of the insertion hole 320 toward the multi-disc clutch 8. An annular pressing member 323 (refer to FIG. 2) is disposed radially outward of the cylindrical portion 321. The pressing member 323 presses the multi-disc clutch 8 upon reception of the thrust force from the retainer 32. The pressing member 323 is connected to a straight spline fitting portion 132b of the cylindrical portion 132 of the outer rotary member 13 by spline-fitting. A needle roller bearing 324 (refer to FIG. 2) is interposed between the one-side end face of the pressing member 323 and the multi-disc clutch 8-side end face of the retainer 32.

Multiple (three in the present embodiment) protruding pieces 322 are formed on the outer peripheral edge of the retainer 32. The protruding pieces 322 protrude in the radial direction of the retainer 32. The protruding pieces 322 are arranged at equal intervals in the circumferential direction of the retainer 32. Each of the protruding pieces 322 has a guide insertion hole 322a through which the corresponding guide member 32b is passed. Multiple (three in the present embodiment) pin insertion holes 32a through which the support pins 34 illustrated in FIG. 6 are passed are formed in the outer peripheral edge of the retainer 32 so as to extend in the radial direction.

As illustrated in FIG. 3, each support pin 34 is attached to the retainer 32 with a nut 35. As illustrated in FIG. 6, the rolling member 33 is disposed on the outer periphery of the support pin 34. The rolling member 33 is supported so as to be rotatable relative to the support pin 34 via a needle roller 36 (refer to FIG. 2).

As illustrated in FIG. 7, if the recess 315-side end portion of the tilted face 316a, out of the both end portions of the tilted face 316a in the circumferential direction of the cam member 31, is defined as a starting end portion $316a_1$, the cam mechanism 3 outputs a first cam thrust force $P_1$ (refer to FIG. 2) in a direction parallel to the rotation axis O from the retainer 32, in a state where each rolling member 33 is located at the corresponding starting end portion $316a_1$.

If the end portion of the tilted face 316a, which is on the opposite side of the tilted face 316a from the starting end portion $316a_1$, that is, the flat face 316b-side end portion of the tilted face 316a, is defined as a terminal end portion $316a_2$, the cam mechanism 3 outputs a second cam thrust force $P_2$ (refer to FIG. 2) that is larger than the first cam thrust force $P_1$ from the retainer 32 in a state where each rolling member 33 is located between the starting end portion $316a_1$ and the terminal end portion $316a_2$. At this time, the cam member 31 transmits a reaction force F (a first reaction force $F_1$ against the first cam thrust force $P_1$ and a second reaction force $F_2$ against the second cam thrust force $P_2$) generated by reaction of the cam thrust force P (the first cam thrust force $P_1$ and the second cam thrust force $P_2$) to a piston 61 of the pressure-conversion mechanism 6 (described later).

Figure 8:
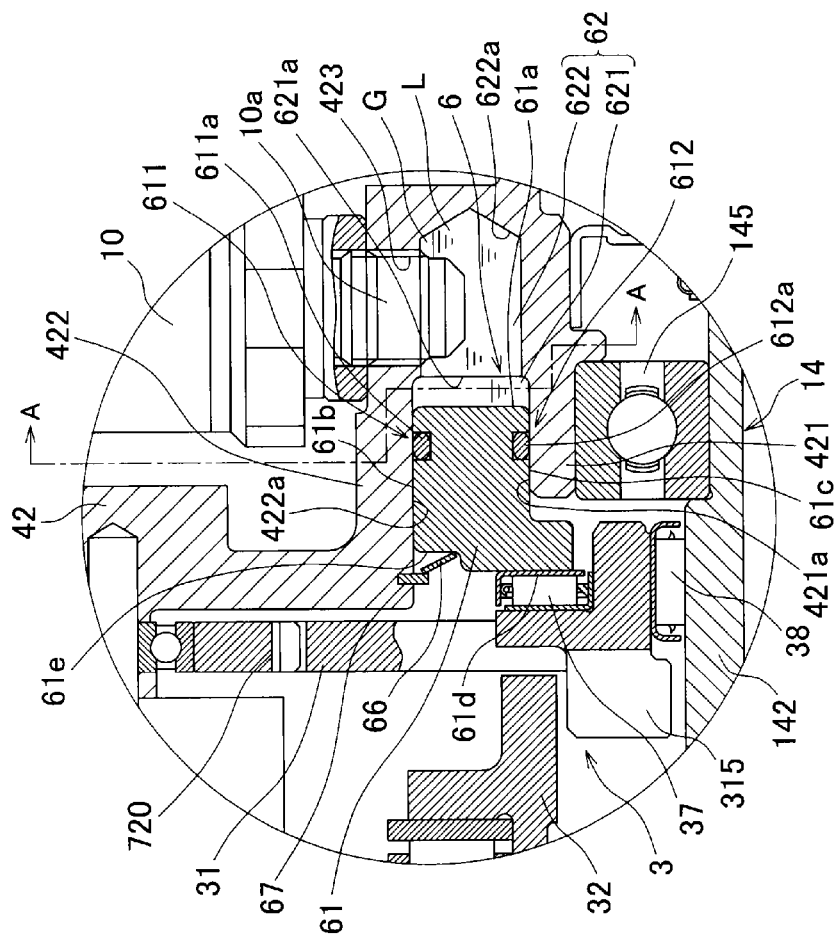
FIG. 8 is an enlarged view illustrating a pressure conversion mechanism and its surroundings.
Figure 9:
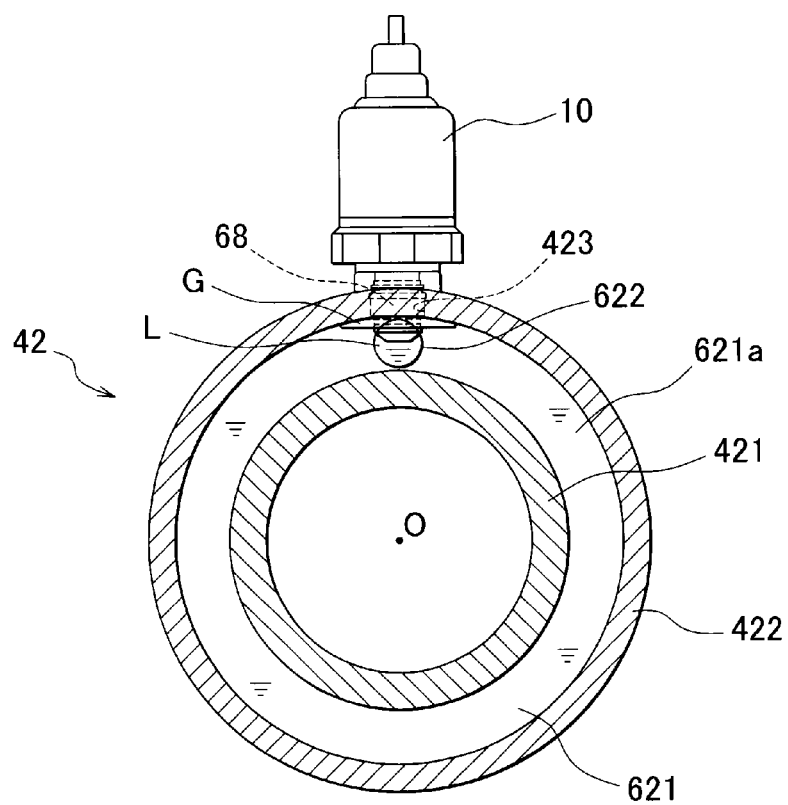
FIG. 9 is a sectional view taken along the line A-A in FIG. 8.
Figure 10:
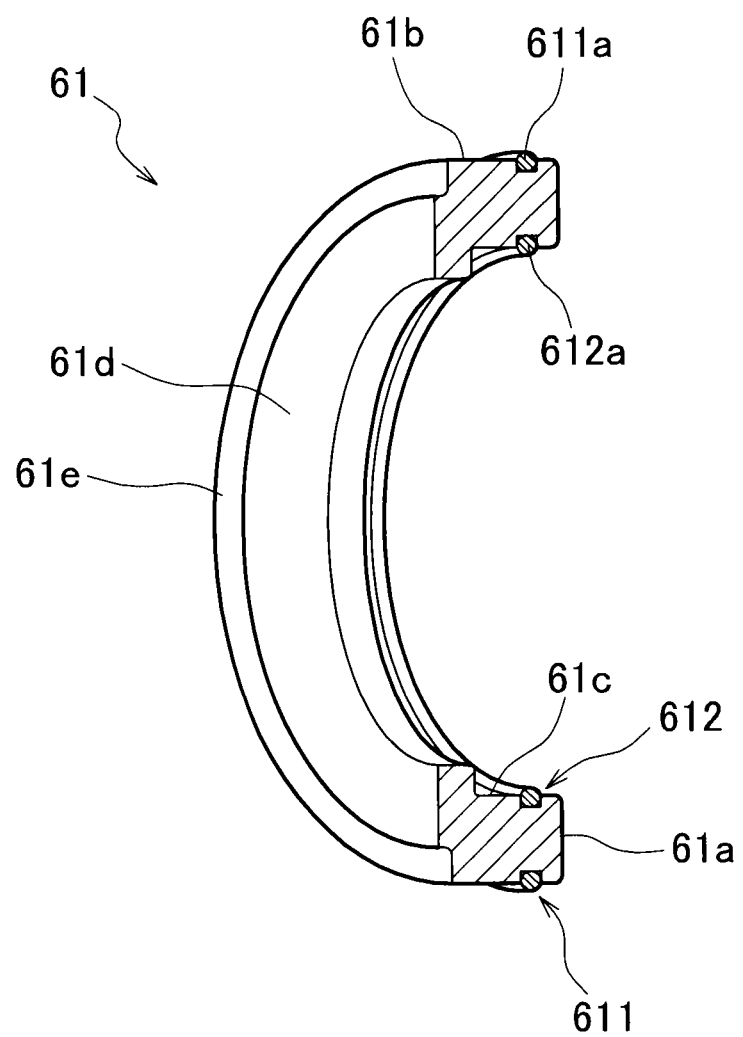
FIG. 10 is a sectional perspective view of a piston of the pressure conversion mechanism.

FIG. 8 is an enlarged view illustrating the pressure-conversion mechanism 6 and its surroundings. FIG. 9 is a sectional view taken along the line A-A in FIG. 8. FIG. 10 is a sectional perspective view illustrating the piston 61 of the pressure-conversion mechanism 6.

The pressure-conversion mechanism 6 includes the piston 61 that receives the reaction force F against the cam thrust force P from the cam mechanism 3, a pressure chamber 62 that is formed in the lid 42 of the housing 4, in which the multi-disc clutch 8 and the cam mechanism 3 are accommodated, and that retains the fluid L and a gas G, a snap ring 67 that is attached to the lid 42, and a disc spring 66 that is disposed between the snap ring 67 and a pressed face 61e of the piston 61 and that urges the piston 61 in the axial direction. The pressure-conversion mechanism 6 converts the reaction force F into the pressure of the fluid L in the pressure chamber 62 with the use of the piston 61.

In the present embodiment, the fluid L is, for example, mineral oil and the gas G is retained, for example, at a ratio of 3% to 10% at the normal temperature (25° C.) with respect to the volumetric capacity of the pressure chamber 62. The temperatures of the fluid L and the gas G become values corresponding to the temperature of the lubricant Lo sealed in the housing 4 by thermal conduction of the piston 61 and the lid 42 of the housing 4.

As illustrated in FIG. 9, the pressure chamber 62 includes a first pressure chamber 621 having an annular shape around the rotation axis O and located between an inner wall portion 421 and an outer wall portion 422 of the lid 42, and a second pressure chamber 622 that is open at a bottom face 621a of the first pressure chamber 621 and that extends in the direction parallel to the rotation axis O.

The first pressure chamber 621 is an annular groove that is deep in the direction parallel to the rotation axis O, and is open toward the cam member 31. The bottom face 621a of the first pressure chamber 621 is formed of a flat face perpendicular to the depth direction of the first pressure chamber 621, and the second pressure chamber 622 is opened at one position in the circumferential direction of the bottom face 621a.

The second pressure chamber 622 is a circular hole of which the deep end is closed. The second pressure chamber 622 is formed, for example, by drilling, and the bottom face 622a thereof has tapered shape.

A fitting hole 423 for fitting the pressure sensor 10 to the lid 42 is formed in the lid 42 so as to communicate with the second pressure chamber 622. In other words, the second pressure chamber 622 is formed at a position corresponding to the position at which the pressure sensor 10 is disposed. The fitting hole 423 is formed so as to be orthogonal to the second pressure chamber 622, one end thereof opens into the second pressure chamber 622, and the other end thereof is formed as a circular hole that opens to the outside of the housing 4 (lid 42). An internal thread is formed on the inner face that defines the fitting hole 423, and an external thread formed on the outer face of a cylindrical portion 6a formed at an end portion of the pressure sensor 10 is screwed into the internal thread.

The piston 61 is formed in an annular shape around the rotation axis O, and one axial end portion thereof is accommodated in the first pressure chamber 621 of the pressure chamber 62. An outer seal holding portion 611 that holds an outer seal member 611a that seals a gap between an outer peripheral face 61b of the piston 61 and an inner peripheral face 422a of the outer wall portion 422 is formed in the outer peripheral face 61b of the piston 61 along the entire periphery in the circumferential direction. Similarly, an inner seal holding portion 612 that holds an inner seal member 612a that seals a gap between an inner peripheral face 61c of the piston 61 and an outer peripheral face 421a of the inner wall portion 421 is formed in the inner peripheral face 61c of the piston 61 along the entire periphery in the circumferential direction.

The outer seal member 611a and the inner seal member 612a are each formed of an elastic member having a circular cross section, for example, an annular O-ring. The fluid L and the gas G are sealed in the pressure chamber 62 by the piston 61, the outer seal member 611a and the inner seal member 612a.

The piston 61 has a flat fluid pressing face 61a that presses the fluid L. The piston 61 has a bearing contact face 61d that comes into contact with a needle thrust roller bearing 37 interposed between the piston 61 and the cam member 31. The bearing contact face 61d is formed on the opposite side of the piston 61 from the fluid pressing face 61a.

The pressed face 61e is formed at a position radially outward of the bearing contact face 61d. The disc spring 66 comes in contact with the pressed face 61e to press the piston 61 and urges the piston 61 in the same direction as the direction of the reaction force F.

When the piston 61 receives, at the bearing contact face 61d, the reaction force F from the cam member 31 via the needle thrust roller bearing 37 and is pressed toward the second pressure chamber 622 along the direction parallel to the rotation axis O, the fluid pressing face 61a presses the fluid L and the fluid L and the gas G in the pressure chamber 62 is compressed and the pressure in the pressure chamber 62 increases. At this time, because the gas G has a higher compression rate with respect to pressure than the fluid L, the gas G is mainly compressed in the pressure chamber 62.

On the other hand, when the clutch is disengaged and therefore the electric motor 5 is not supplied with currents and the cam thrust force P is not generated, the piston 61 does not receive the reaction force F from the cam member 31, and thus the fluid L and the gas G are not compressed and the pressure of the fluid L in the pressure chamber 62 is lowered. However, because the piston 61 receives an urging force from the disc spring 66 at the pressed face 61e, the pressure in the pressure chamber 62 is kept higher than the atmospheric pressure even when the clutch is disengaged. Because the gas G greatly varies in volume depending on its temperature variations and the gas G is sealed in the pressure chamber 62, the pressure in the pressure chamber 62 when the clutch is disengaged greatly varies depending on the temperature. That is, the rate of variation in the pressure in the pressure chamber 62 depending on the temperature variations is higher than that when only the fluid L is sealed in the pressure chamber 62.

The pressure sensor 10 is disposed such that a distal end portion of a tubular portion 10a into which the pressure of the fluid L is introduced is immersed in the fluid L in the second pressure chamber 622. The pressure sensor 10 detects the pressure of the fluid L, converts the detected pressure into an electrical signal corresponding to the pressure value, and outputs the electrical signal to the controller 12. The controller 12 estimates the cam thrust force P actually acting on the multi-disc clutch 8 on the basis of the electrical signal, and computes a command value of the current that is supplied to the electric motor 5 in a feedback manner such that the estimated cam thrust force coincides with the cam thrust force based on the torque to be transmitted by the multi-disc clutch 8.

Next, the operation of the driving force transmission control apparatus 1 in the present embodiment will be described with reference to FIG. 1, FIG. 2, FIG. 7 and FIG. 11.

In order to connect the propeller shaft 20 to the axle shaft 25R with the use of the driving force transmission apparatus 11, current is supplied from the controller 12 to the electric motor 5, and the rotative force generated by the electric motor 5 is applied to the cam mechanism 3 to actuate the cam mechanism 3. At this time, the cam member 31 of the cam mechanism 3 is rotated in one direction around the rotation axis O. As illustrated in FIG. 7, when the cam member 31 is rotated, each rolling member 33 starts rolling from the state (initial state) where the rolling member 33 is located in the corresponding recess 315 of the cam member 31, runs onto the tilted face 316a of the corresponding protrusion 316 of the cam member 31, and is then located at the starting end portion $316a_1$. Thus, the rotative force generated by the electric motor 5 is converted into the first cam thrust force $P_1$ for reducing the gaps between the outer clutch plates 81 and the inner clutch plates 82 of the multi-disc clutch 8. The reaction of the first cam thrust force $P_1$ generates the first reaction force $F_1$ which presses the piston 61 of the pressure conversion mechanism 6.

At this time, the rolling members 33 press the retainer 32 toward the multi-disc clutch 8 (in the direction of an arrow X in FIG. 2 and FIG. 7) via the support pins 34 and the needle rollers 36. The retainer 32 presses the pressing member 323 in such a direction that the outer clutch plates 81 and the inner clutch plates 82 of the multi-disc clutch 8 approach each other. As the pressing member 323 presses the outer clutch plates 81 and the inner clutch plates 82 in the direction of the arrow X, the gaps between the outer clutch plates 81 and the inner clutch plates 82 which are adjacent to each other are reduced.

The cam member 31 is pressed toward the piston 61 of the pressure conversion mechanism 6 (in a direction opposite to the direction of the arrow X) via the needle thrust roller bearing 37. Thus, the piston 61 is pressed toward the bottom face 621a of the pressure chamber 62, so that the fluid L and the gas G retained in the pressure chamber 62 are compressed.

As the cam member 31 receives the rotative force generated by the electric motor 5 and is further rotated in the one direction around the rotation axis O, each rolling member 33 rolls on the tilted face 316a of the protrusion 316 toward the flat face 316b, and reaches the terminal end portion $316a_2$ of the tilted face 316a. Thus, the rotative force generated by the electric motor 5 is converted into the second cam thrust force $P_2$ for frictionally engaging the outer clutch plates 81 and the inner clutch plates 82 of the multi-disc clutch 8 with each other. The reaction of the second cam thrust force $P_2$ generates the second reaction force $F_2$ that presses the piston 61 of the pressure conversion mechanism 6.

The pressing member 323 to which the second cam thrust force $P_2$ is applied from the rolling member 33 presses the outer clutch plates 81 and the inner clutch plates 82 in the direction of the arrow X. As a result, the outer clutch plates 81 and the inner clutch plates 82 that are adjacent to each other are frictionally engaged with each other. Thus, the driving force generated by the engine 102 is transmitted from the outer rotary member 13 to the inner rotary member 14 via the multi-disc clutch 8 and is then transmitted from the inner rotary member 14 to the rear wheel 105R via the axle shaft 25R, so that the rear wheel 105R is driven to be rotated. When the rear wheel 105R is driven to be rotated, the driving force is also transmitted to the rear wheel 105L that pairs up with the rear wheel 105R. As a result, the vehicle is placed in the four-wheel-drive mode.

The cam member 31 is further pressed toward the piston 61 (in a direction opposite to the direction of the arrow X) by the second reaction force $F_2$. Thus, the piston 61 is further pressed toward the bottom face 621a of the pressure chamber 62, and the fluid L and the gas G retained in the pressure chamber 62 are further compressed.

The pressure of the fluid L compressed by the pressure-conversion mechanism 6 is detected by the pressure sensor 10. The pressure sensor 10 outputs an electrical signal corresponding to the detected pressure of the fluid L to the controller 12. The controller 12 computes the cam thrust force P (the first cam thrust force P1 and the second cam thrust force P2) generated from the cam mechanism 3 on the basis of the signal output from the pressure sensor 10, computes the current command value so that the computed cam thrust force P coincides with the cam thrust force required for the torque to be transmitted, and corrects the value of the current to be supplied to the electric motor 5 as needed.

When the relationship between the current supplied to the electric motor 5 and the transmission torque actually transmitted by the multi-disc clutch 8 is measured with the use of the driving force transmission control system 1 configured as described above, the transmission torque with respect to the current supplied to the electric motor 5 varies depending on the temperature. That is, even when the current supplied to the electric motor 5 is constant, the driving force transmitted to the rear wheels 105R, 105L varies depending on the temperature.

One of the factors of the above-described variations is the influence of the variations in the viscosity of the lubricant Lo, which is used to lubricate the outer clutch plates 81 and the inner clutch plates 82, due to temperature variations. The viscosity of the lubricant Lo tends to decrease as the temperature rises and tends to increase as the temperature falls. Thus, the torque transmitted between the outer clutch plates 81 and the inner clutch plates 82 varies depending on the temperature of the lubricant Lo. As a result, the transmission torque transmitted by the multi-disc clutch 8 with respect to the current supplied to the electric motor 5 varies.

In the driving force transmission control system 1 according to the present embodiment, in order to reduce the influence of the variations in the viscosity of the lubricant, the temperature of the fluid L is estimated from characteristic information indicating the relationship between the pressure and the temperature of the fluid L when the multi-disc clutch 8 is disengaged, and the current command value is further corrected on the basis of the estimated temperature to reduce the influence of the variations in the viscosity of the lubricant due to the temperature variations. The characteristic information is stored in the storage unit 121 of the controller 12, and is obtained in advance through measurements in, for example, experiments. A concrete example of the characteristic information will be described later.

The control unit 122 stores the pressure of the fluid L during disengagement of the multi-disc clutch 8 or a correlated value, which is correlated to the pressure of the fluid L during disengagement of the multi-disc clutch 8, in the storage unit 121, and computes a current command value on the basis of the pressure of the fluid L, to which the reaction force F against the cam thrust force has been applied, and the pressure of the fluid L or the correlated value stored in the storage unit 121. More specifically, the control unit 122 computes a current command value by correcting the current command value, which is obtained based on the torque that should to be transmitted by the multi-disc clutch 8, on the basis of the pressure of the fluid L during disengagement of the multi-disc clutch 8 or the correlated value stored in the storage unit 121. The following description will be provided on the case where a current command value is computed on the basis of the estimated temperature of the fluid L (hereinafter, simply referred to as "estimated temperature") computed based on the pressure of the fluid L during disengagement of the multi-disc clutch 8, the estimated temperature of the fluid L being used as the correlated value correlated to the pressure of the fluid L during disengagement of the multi-disc clutch 8.

Figure 11:
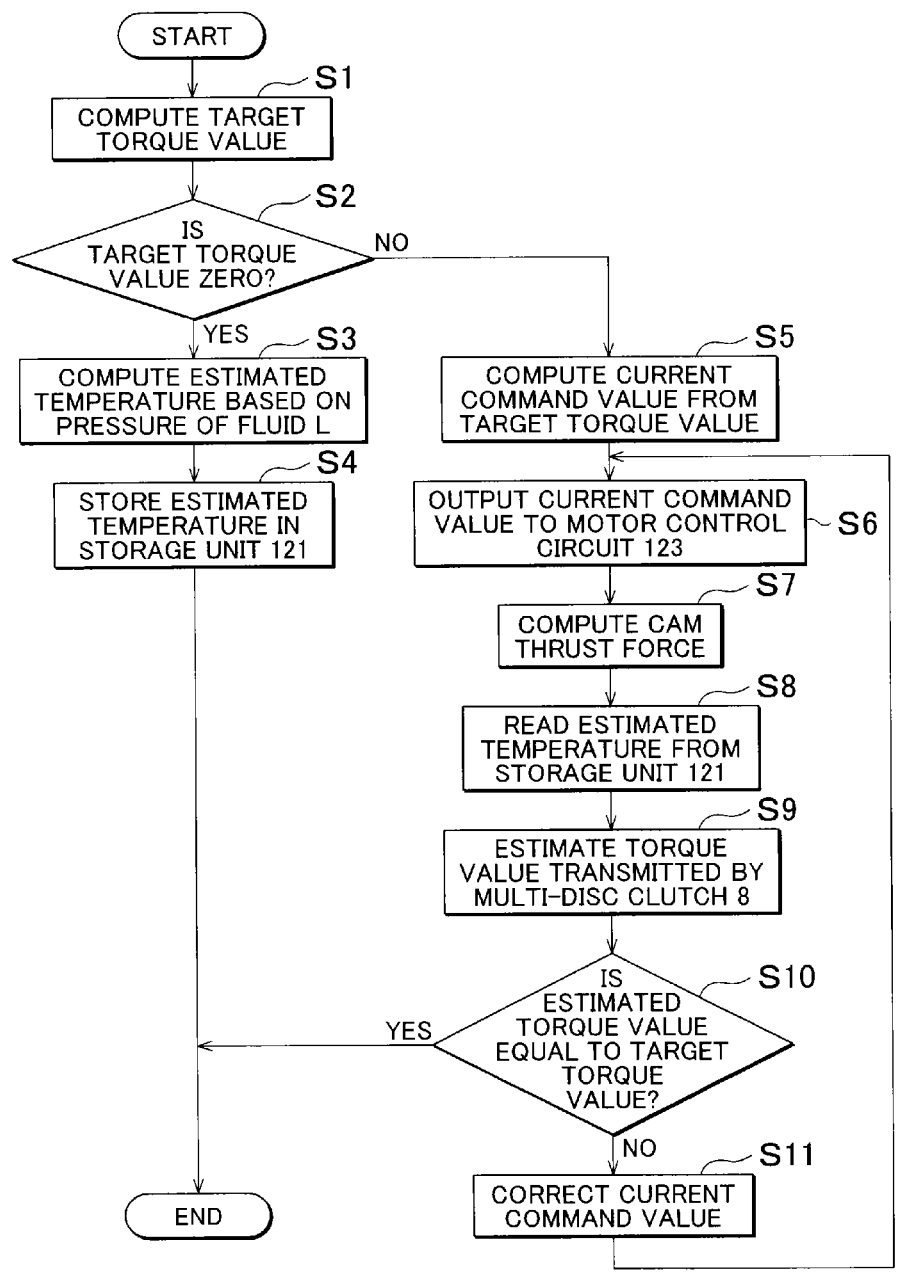
FIG. 11 is a flowchart illustrating a concrete example of the procedure executed by the controller of the control system according to the first embodiment of the invention.

FIG. 11 is a flowchart illustrating a procedure that is executed by the control unit 122 of the controller 12. The flowchart is an example of a mode for carrying out the invention, and the advantageous effects of the invention may be produced by adopting a procedure different from the procedure illustrated in the flowchart in FIG. 11.

The control unit 122 computes a target torque value, which is a torque that should be transmitted from the outer rotary member 13 to the inner rotary member 14 by the multi-disc clutch 8 on the basis of a vehicle travelling state (step S1). The vehicle travelling state includes, for example, a front-rear wheel rotational speed difference, which is a difference between the average rotational speed of the front wheels 104R, 104L and the average rotational speed of the rear wheels 105R, 105L and an amount of accelerating operation based on a driver's depressing operation on an accelerator pedal. The target torque value is set to a higher value as the front-rear wheel rotational speed difference becomes larger and the amount of accelerating operation becomes larger.

For example, when any of the front wheels 104R, 104L slips and the front-rear wheel rotational speed difference increases, the control unit 122 ends the slip by increasing the target torque value and increasing the ratio of the driving force distributed to the rear wheels 105R, 105L to the driving force distributed to the front wheels 104R, 104L. When the driver depresses the accelerator pedal, the ratio of the driving force distributed to the rear wheels 105R, 105L to the driving force distributed to the front wheels 104R, 104L is increased to prevent the slip of the front wheels 104R, 104L, thereby stably accelerating the four-wheel-drive vehicle 100.

Then, the control unit 122 determines whether the target torque value is zero (step S2). When it is determined that the target torque value is zero (YES in step S2), the control unit 122 computes an estimated temperature of the fluid L on the basis of an electrical signal from the pressure sensor 10 (step S3) and stores the computed estimated temperature in the storage unit 121 (step S4). The processes in steps S2, S3 are repeatedly executed in prescribed control cycles while the target torque value is kept zero, and the value of the estimated temperature stored in the storage unit 121 is updated as needed.

On the other hand, when it is determined in step S2 that the target torque value is not zero (NO in step S2), the control unit 122 computes a current command value so as to generate a cam thrust force corresponding to the target torque value (step S5).

The control unit 122 outputs the current command value computed in step S5 to the motor control circuit 123 (step S6). Thus, a current corresponding to the corrected current command value is supplied to the electric motor 5 by the motor control circuit 123, and the rotative force generated by the electric motor 5 is transmitted to the cam mechanism 3 via the speed reduction mechanism 9. The cam mechanism 3 receives the rotative force generated by the electric motor 5 and transmitted from the speed reduction mechanism 9, and generates a cam thrust force for pressing the multi-disc clutch 8 in the axial direction. The reaction force against the cam thrust is converted into the pressure of the fluid L by the pressure-conversion mechanism 6.

The control unit 122 computes the cam thrust generated by the cam mechanism 3 on the basis of the electrical signal from the pressure sensor 10 that has detected the pressure of the fluid L (step S7). Then, the control unit 122 reads, from the storage unit 121, the estimated temperature stored in the storage unit 121 in step S4 (step S8), and estimates a value of the torque (hereinafter, referred to as "torque value") transmitted from the outer rotary member 13 to the inner rotary member 14 by the multi-disc clutch 8, in consideration of the viscosity of the lubricant Lo corresponding to the estimated temperature, on the basis of the computed cam thrust force and the estimated temperature (step S9).

When the estimated temperature is low, the viscosity of the lubricant Lo is relatively high and thus the torque value transmitted from the outer rotary member 13 to the inner rotary member 14 is estimated to be high with respect to the cam thrust force computed in step S7. The torque value transmitted from the outer rotary member 13 to the inner rotary member 14 is estimated so that the higher the estimated temperature is, the lower the torque value with respect to the cam thrust force is.

Then, the control unit 122 determines whether the torque value (estimated torque value) estimated in step S9 is equal to the target torque value computed in step S1 (step S10). This determination is made depending on whether the difference between the estimated torque value estimated in step S9 and the target torque value computed in step S1 is within a prescribed range in which the estimated torque value and the target torque value are regarded as being substantially equal to each other.

When it is determined that the estimated torque value estimated in step S9 and the target torque value computed in step S1 are equal to each other (YES in step S10), the control unit 122 ends the procedure in the flowchart illustrated in FIG. 11. On the other hand, when it is determined that the estimated torque value estimated in step S9 is not equal to the target torque value (NO in step S10), the control unit 122 corrects the current command value (step S11).

The correction in step S11 is made by decreasing the current command value when the estimated torque value estimated in step S9 exceeds the target torque value, and increasing the current command value when the estimated torque value estimated in step S9 falls below the target torque value. The amount of decrease or increase in the current command value is preferably set to be greater as the difference between the estimated torque value and the target torque value becomes greater.

The estimated torque value obtained in step S9 is computed in consideration of the viscosity of the lubricant Lo acquired on the basis of the pressure of the fluid L during disengagement of the multi-disc clutch 8, and the correction in step S11 is made so that the estimated torque value computed in consideration of the viscosity of the lubricant Lo is equal to the target torque value. Thus, the control unit 122 corrects the current command value on the basis of the pressure of the fluid L during disengagement of the multi-disc clutch 8. The control unit 122 outputs the corrected current command value to the motor control circuit 123 (step S6), and executes the processes in steps S7 to S10 again.

In the present embodiment, the disc spring 66 disposed between the snap ring 67 and the pressed face 61e of the piston 61 urges the piston 61 in the same direction as the direction of the reaction force F. The operation and advantageous effect of the disc spring 66 will be described below with reference to FIG. 12.

Figure 12:
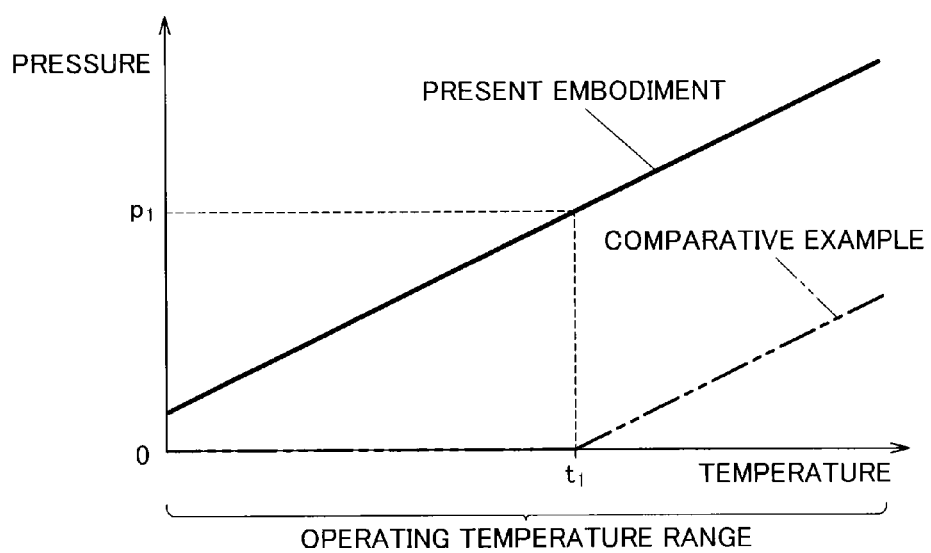
FIG. 12 is a graph illustrating the relationship between the pressure and the temperature during disengagement of a clutch.

FIG. 12 is a graph illustrating the relationship between the temperature of the fluid L during disengagement of the multi-disc clutch 8 and the pressure detected by the pressure sensor 10 in each of the present embodiment and a comparative example in which the piston 61 is retained by the snap ring 67 without using the disc spring 66. In the graph, the present embodiment is denoted by a solid line and the comparative example is denoted by a two-dot chained line. The characteristic denoted by the solid line in FIG. 12 is stored as the characteristic information in the storage unit 121.

In the comparative example, the volumes of the fluid L and the gas G vary with the temperature variations in the pressure chamber 62, as in the present embodiment. However, when the fluid L and the gas G shrink with a decrease in temperature, the piston 61 is separated from the snap ring 67 and moves toward the bottom face 621a of the first pressure chamber 621. In the graph illustrated in FIG. 12, the temperature in the pressure chamber 62, at which the piston 61 is separated from the snap ring 67, is denoted by t1.

In the comparative example, when the temperature is lower than or equal to the temperature t1, the pressure of the fluid L detected by the pressure sensor 10 is equal to the atmospheric pressure and the value detected by the pressure sensor 10 is kept constant at 0 (zero). That is, when the temperature is equal to or lower than the temperature t1, it is not possible to obtain the temperature of the fluid L on the basis of the value detected by the pressure sensor 10.

Therefore, in the present embodiment, the driving force transmission apparatus 11 is configured such that the piston 61 is pressed by the disc spring 66 to increase the pressure of the fluid L in the pressure chamber 62 and thus the pressure of the fluid L in the pressure chamber 62 is higher than or equal to the atmospheric pressure, in an operating temperature range (−40° C. to 150° C.).

Thus, the value detected by the pressure sensor 10 at the temperature t1 is a pressure p1 and the pressure of the fluid L is equal to or higher than the atmospheric pressure, even at the lower limit temperature of the operating temperature range. As a result, in the entire operating temperature range, the value detected by the pressure sensor 10 varies depending on the temperature, and thus the temperature is estimated based on the pressure of the fluid L.

According to the first embodiment described above, the following operations and advantageous effects are obtained.

Because the control unit 122 corrects the current command value on the basis of the pressure of the fluid L during disengagement of the multi-disc clutch 8 so that the influence of the variations in the viscosity of the lubricant Lo due to the temperature variations is reduced, it is possible to suppress variations in the transmission torque transmitted by the multi-disc clutch 8 due to the temperature variations. Consequently, it is possible to accurately adjust the driving force that is transmitted to the rear wheels 105R, 105L by the driving force transmission apparatus 11.

Because the pressure chamber 62 retains the fluid L and the gas G that expands or shrinks with the temperature variations more largely than the fluid L, the variation rate of the pressure in the pressure chamber 62 with the temperature variations is high. Thus, it is possible to enhance the accuracy of temperature estimation based on the value detected by the pressure sensor 10.

Because the piston 61 is urged in the same direction as the direction of the reaction force by the disc spring 66, the value detected by the pressure sensor 10 varies depending on the temperature within a wide temperature range and thus it is possible to estimate the temperature based on the pressure of the fluid L.

A second embodiment of the invention will be described below with reference to FIG. 13. In the present embodiment, the control unit 122 corrects the target torque value that should be transmitted by the multi-disc clutch 8 on the basis of the pressure of the fluid L during disengagement of the multi-disc clutch 8 so that the influence of variations in the viscosity of the lubricant. Then, the control unit 122 computes a current command value corresponding to the corrected target torque value and outputs the computed current command value to the motor control circuit 123.

Figure 13:
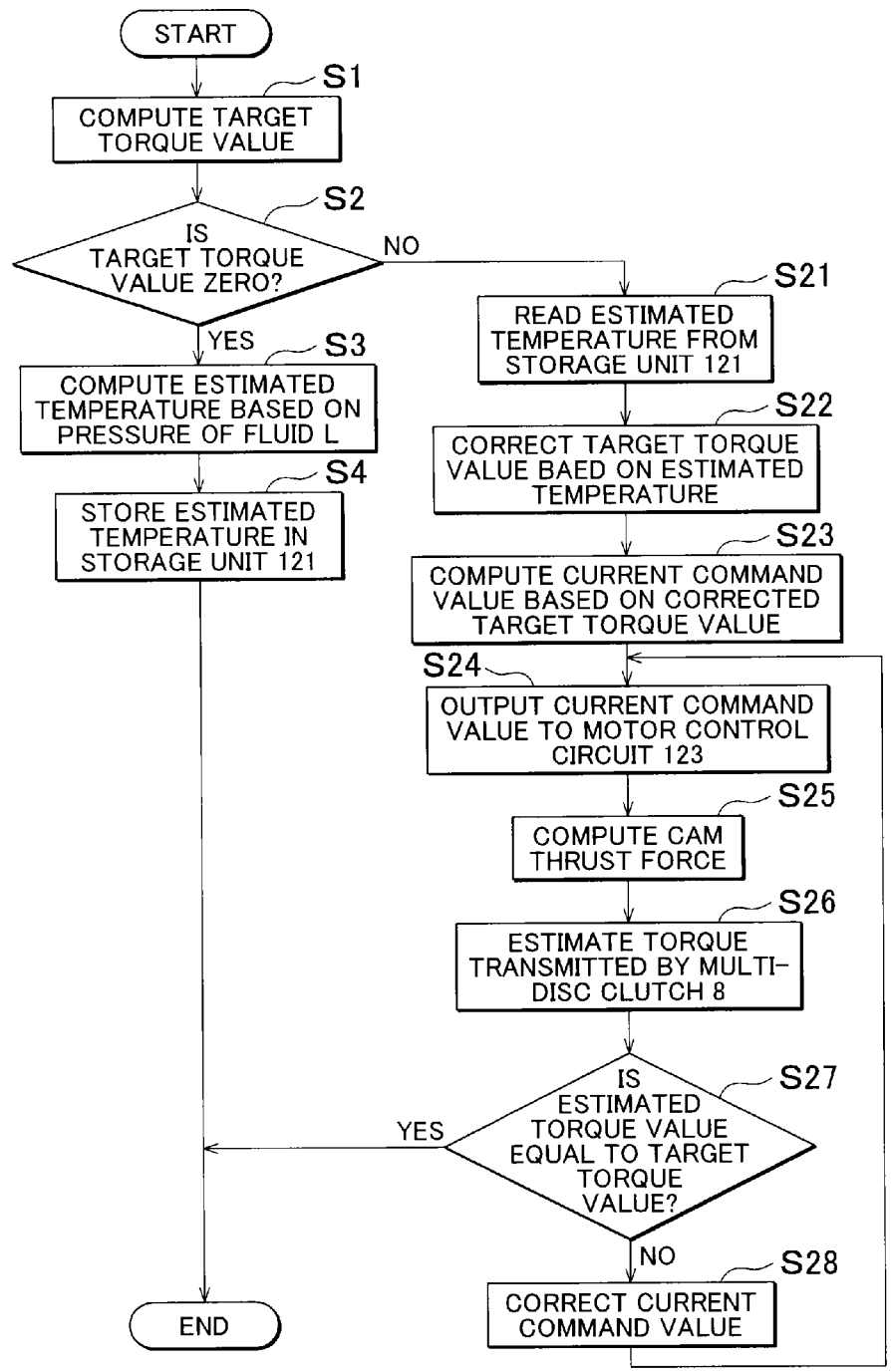
FIG. 13 is a flowchart illustrating a concrete example of the procedure executed by the controller of the control system according to a second embodiment of the invention.

FIG. 13 is a flowchart illustrating a procedure that is executed by the control unit 122 of the controller 12 according to the present embodiment. The processes executed by the control unit 122 according to the present embodiment (steps S21 to S28) differ from the processes executed by the control unit 122 in the first embodiment (steps S5 to S11). The processes in steps S1 to S4 in the present embodiment are the same as the processes in steps S1 to S4 in the first embodiment and thus description thereof will be omitted.

When it is determined in step S2 that the target torque value is not zero (NO in step S2), the control unit 122 reads the estimated temperature stored in the storage unit 121 in step S4 (step S21). Then, the control unit 122 corrects the target torque value computed in step S1 so that the influence of the variations in the viscosity of the lubricant Lo based on the estimated temperature is reduced (step S22).

That is, when the estimated temperature is low, the viscosity of the lubricant Lo is relatively high and thus the torque that is transmitted from the outer rotary member 13 to the inner rotary member 14 becomes high with respect to the cam thrust. Thus, the target torque value is corrected to a lower value on the basis of the estimated temperature so that the influence of the variations in the lubricant Lo due to the temperature variations is reduced. On the other and, when the estimated temperature is high, the viscosity of the lubricant Lo is relatively low and thus the target torque value is corrected to a higher value on the basis of the estimated temperature so that the influence of the variations in the lubricant Lo due to the temperature variations is reduced.

The control unit 122 computes the current command value so that the cam thrust corresponding to the corrected target torque value is generated (step S23), and outputs the computed current command value to the motor control circuit 123 (step S24). Thus, the current corresponding to the current command value is supplied to the electric motor 5 by the motor control circuit 123, and the rotative force generated by the electric motor 5 is transmitted to the cam mechanism 3 via the speed reduction mechanism 9. The cam mechanism 3 receives the rotative force generated by the electric motor 5 and transmitted from the speed reduction mechanism 9, and generates the cam thrust for pressing the multi-disc clutch 8 in the axial direction. Then, the reaction force against the cam thrust force is converted into the pressure of the fluid L by the pressure-conversion mechanism 6.

The control unit 122 computes the cam thrust generated from the cam mechanism 3 on the basis of the electrical signal from the pressure sensor 10 that has detected the pressure of the fluid L (step S25). The control unit 122 estimates the torque value that is transmitted from the outer rotary member 13 to the inner rotary member 14 via the multi-disc clutch 8 on the basis of the computed cam thrust (step S26). The estimation of the torque value is executed by multiplying the cam thrust force by a prescribed coefficient, by referring to a characteristic map stored in advance in the storage unit 121, or the like, without taking into account the variations in the viscosity of the lubricant Lo due to the temperature variations.

Then, the control unit 122 determines whether the torque value (estimated torque value) estimated in step S26 is equal to the target torque value corrected in step S22 (step S27).

When it is determined that the estimated torque value estimated in step S26 is equal to the target torque value corrected in step S22 (YES in step S27), the control unit 122 ends the procedure in the flowchart illustrated in FIG. 13.

On the other hand, when it is determined that the estimated torque value estimated in step S26 is not equal to the corrected target torque value (NO in step S27), the control unit 122 corrects the current command value (step S28). The correction in step S28 is executed by decreasing the current command value when the estimated torque value estimated in step S26 exceeds the target torque value and by increasing the current command value when the estimated torque value estimated in step S26 falls below the target torque value. The amount of a decrease or increase in the current command value is preferably set to be greater as the difference between the estimated torque value and the target torque value becomes greater.

The control unit 122 outputs the corrected current command value to the motor control circuit 123 (step S24), and executes the processes in steps S25 to S27 again.

According to the present embodiment, the same advantageous effects as those in the first embodiment are produced.

While the driving force transmission control system according to the invention has been described based on the above-described embodiments, the invention is not limited to the above-described embodiments and may be implemented in various other embodiments within the scope of the invention.

For example, in the above-described embodiments, the estimated temperature of the fluid L computed on the basis of the pressure of the fluid L during disengagement of the multi-disc clutch 8 is stored in the storage unit 121 and the current command value is computed on the basis of the estimated temperature. However, the invention is not limited to this configuration. The pressure of the fluid L during disengagement of the multi-disc clutch 8 may be stored in the storage unit 121, and the current command value may be computed on the basis of the stored pressure. The viscosity of the lubricant Lo may be estimated from the estimated temperature of the fluid L, and the estimated viscosity of the lubricant Lo may be stored in the storage unit 121 and used to compute the current command value. The viscosity of the lubricant Lo is an example of the correlated value correlated to the pressure of the fluid L during disengagement of the multi-disc clutch 8. As described above, various index values that vary depending on the pressure of the fluid L during disengagement of the multi-disc clutch 8 may be used as the correlated value correlated the pressure of the fluid L during disengagement of the multi-disc clutch 8.

In the above-described embodiments, the piston 61 is urged by the disc spring 66 to increase the pressure in the pressure chamber 62. However, the invention is not limited to this configuration. An elastic member such as a coil spring or a rubber member may be used instead of the disc spring 66. The piston 61 may be urged by setting the spring constant of the return spring 325 to a higher value. That is, in the above-described embodiments, a spring having a spring constant sufficient to suppress movement of the retainer 32 toward the multi-disc clutch 8 during disengagement of the clutch is adopted as the return spring 325. However, for example, when a spring having a spring constant sufficient to increase the pressure in the pressure chamber 62 in the entire or partial operating temperature range is used, it is possible to obtain the same operations and advantageous effects as those when the disc spring 66 are used. In this case, the return spring 325 may function as an elastic member in the invention.

When the pressure in the pressure chamber 62 varies to such a degree that the temperature is estimated based on the value detected by the pressure sensor 10, due to the variations in the volume of the fluid L caused by the temperature variations, the gas G need not be sealed in the pressure chamber 62.

What is claimed is:

1. A driving force transmission control system comprising:
   an electric motor;
   a clutch including an outer friction member and an inner friction member that are disposed on the same axis so as to be rotatable relative to each other and that are frictionally engaged with each other by being pressed in an axial direction of the clutch;
   an outer rotary member that rotates together with the outer friction member;
   an inner rotary member that rotates together with the inner friction member;
   a cam mechanism that receives rotative force from the electric motor to generate cam thrust force for pressing the clutch in the axial direction;
   a pressure-conversion mechanism that includes a piston that receives reaction force against the cam thrust force from the cam mechanism, and that converts the reaction force into pressure of a fluid in a pressure chamber using the piston;
   a pressure sensor that detects the pressure of the fluid; and
   a control unit that computes a command value of a current to be supplied to the electric motor, wherein
   the control unit stores the pressure of the fluid during disengagement of the clutch or a correlated value correlated with the pressure of the fluid during disengagement of the clutch, and computes the command value based on the pressure of the fluid to which the reaction force against the cam thrust force has been applied, and the stored pressure of the fluid or the stored correlated value.

2. The driving force transmission control system according to claim 1, wherein the control unit computes the command value by correcting the command value of the current computed from torque to be transmitted by the clutch, based on the stored pressure of the fluid or the stored correlated value.

3. The driving force transmission control system according to claim 2, wherein:
   the clutch is a wet clutch in which the outer friction member and the inner friction member are lubricated with the lubricant; and
   the control unit corrects the command value based on the pressure of the fluid during disengagement of the clutch so as to reduce an influence of temperature variations in the lubricant on the torque to be transmitted by the clutch.

4. The driving force transmission control system according to claim 3, wherein the pressure chamber retains a gas along with the fluid.

5. The driving force transmission control system according to claim 2, wherein the pressure chamber retains a gas along with the fluid.

6. The driving force transmission control system according to claim 1, wherein:
   the clutch is a wet clutch in which the outer friction member and the inner friction member are lubricated with the lubricant; and
   the control unit corrects the command value based on the pressure of the fluid during disengagement of the clutch so as to reduce an influence of temperature variations in the lubricant on torque to be transmitted by the clutch.

7. The driving force transmission control system according to claim 6, wherein the pressure chamber retains a gas along with the fluid.

8. The driving force transmission control system according to claim 1, wherein the pressure chamber retains a gas along with the fluid.

9. The driving force transmission control system according to claim 1, further comprising an elastic member that urges the piston in the same direction as a direction of the reaction force to increase the pressure in the pressure chamber during disengagement of the clutch.

* * * * *